June 22, 1937.   O. HARALDSON   2,084,487
METHOD AND MEANS FOR RECOVERING GOLD
Filed May 11, 1935
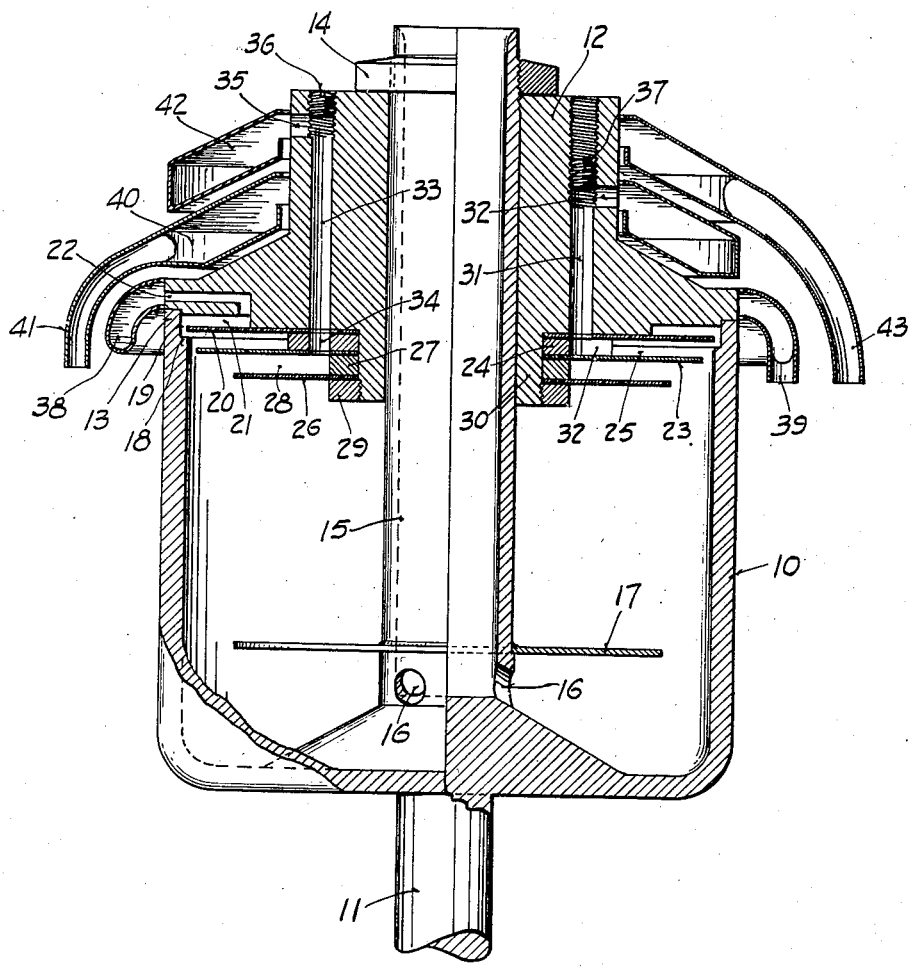
INVENTOR
Olaf Haraldson
BY
ATTORNEY Patented June 22, 1937

2,084,487

UNITED STATES PATENT OFFICE 2,084,487

METHOD AND MEANS FOR RECOVERING GOLD

Olaf Haraldson, Minot, N. Dak.

Application May 11, 1935, Serial No. 20,936

5 Claims. (Cl. 209—199)

This invention relates to the art of extracting gold and other precious metals from their ores and particularly from placer sands.

An object of the present invention is the provision of an improved method and means for separating and continuously liberating gold and other precious metals from placer sands and the like.

Other objects and advantages will appear, expressed or implied, from the following description of an illustrative embodiment of the present invention.

The single figure of the drawing is a vertical sectional view of a separator constructed in accordance with this invention.

The separator shown comprises a bowl 10 mounted upon and driven by a vertical spindle 11 so as to rotate about its vertical central axis. The bowl is closed by an appropriate cover, preferably in the form of a relatively thick end head 12, seated tightly upon the top rim 13 of the bowl. The head is shown clamped in place by a nut 14 threaded upon the exposed end of a vertical central hollow post 15 which extends upwardly from the bottom of the bowl through a central opening in the head.

The hollow post 15 also serves as a conduit through which the mixture to be separated is admitted to the bowl, and for that purpose suitable ports 16 are provided at the lower end of the post. A disk 17 mounted upon the post above and preferably adjacent the ports 16 serves to direct the mixture discharged therethrough toward the periphery of the bowl.

The wall of the bowl is preferably substantially cylindrical except that the rim 13 is reduced to provide an internal shoulder 18 and also a channel 19 into the latter of which projects the periphery of a separator disk 20 fixed to the internal face of the head 12. The head 12 is also reduced to form an annular channel 21 which extends inwardly from the channel 19 above the outer margin of the disk 20. A plurality of radial discharge passages in the head 12, one of which is shown at 22, lead outwardly from the inner edge of channel 21 through the periphery of the head.

A second separator disk 23, mounted on the head 12 below the disk 20, is somewhat smaller than disk 20 and extends outwardly to a point adjacent the internal surface of the bowl and preferably below the shoulder 18. It is spaced below the disk 20 by appropriate means, such as a collar 24, so as to form an annular channel 25 between it and the other disk.

A third separator disk 26 of still smaller diameter is mounted on the head 12 below the disk 23 and spaced therefrom by a collar 27 so as to provide an annular channel 28 therebetween.

The several disks 20, 23 and 26, and collars 24 and 27, are secured in place and in concentric parallel relation by appropriate means, such as a nut 29 threaded onto the exposed end of a reduced extension 30 of the head 12.

The head 12 is provided with two series of upright passages preferably equally spaced from the axis of rotation of the bowl and arranged nearer to that axis than the discharge passages 22 hereinabove mentioned. A passage of one series is shown at 31, communicating with the channel 25, through a radial slot 32 in the collar 24, and also communicating with a radial discharge port 32. A passage of the other series is shown at 33, communicating with the channel 28 through a port 34 in the collar 24, and also communicating with a radial discharge port 35.

Provision is preferably made for regulating and controlling the rate of flow of materials through the passages 31 and 33, and their respective ports 32 and 35. This is accomplished in this instance by the use of screw plugs 36 and 37 threaded in the upper portions of the passages 31 and 33, respectively, and adjustable to regulate the effective areas of the respective ports.

The several passages 22 discharge into an appropriate stationary collector ring or channel 38 of a well known type, encircling the head 12, and equipped with a suitable discharge spout 39. Similarly the several ports 32 discharge into a stationary collector channel 40 having a spout 41, and the ports 35 discharge into a separate stationary collector channel 42 having a spout 43.

In use, the bowl 10 and its cover 12 are rotated continuously as a unit at a moderately high speed, ordinarily about one thousand revolutions per minute, although the particular speed employed is dependent largely upon the nature and condition of the mixture under treatment.

To extract gold or other precious metals from placer sand, the sand, mixed with water, is continuously admitted by gravity to and through the conduit 15 and ports 16 into the bottom of the rotating bowl. At the same time a small amount of mercury is also admitted to the bowl in a similar manner and the entire mixture is thrown centrifugally toward the sides of the bowl. Due to its high specific gravity the mercury promptly separates from the mixture and accumulates against the sides of the bowl to form a rather thin layer which extends substantially throughout the internal surfaces thereof.

As the process continues, this layer of mercury flows upwardly and over the shoulder 18 into the channel 19 where it cooperates with the edge of the disk 20 to form an effective seal against the escape of the lighter sand content of the mixture around the periphery of the disk 20. Under the pressure of the mixture induced by centrifugal force this mercury is forced to flow inwardly against centrifugal force from the channel 19 through the channel 21 until it reaches the discharge passages 22, through which it ultimately escapes into the encircling channel 38 and through the spout 39 into an appropriate receptacle.

In the meantime the free gold or other precious metals contained in the mixture, which are much heavier than the sand, are separated by centrifugal force from the mixture and enter the layer of mercury, formed in the manner above described, and pass out with the mercury through the passages 22, channel 38, and spout 39.

The mercury thus serves as a vehicle by which the gold or other precious metals are delivered continuously from the bowl and, although amalgamation of the mercury with the metals ordinarily occurs, such amalgamation is not essential to the success of the process. In fact metal particles of a nature or in a condition to resist amalgamation, but heavy enough to separate from the mixture and enter the mercury, will be carried from the bowl with the mercury, and any liquid of a specific gravity considerably higher than that of the sand could successfully be employed as a substitute for mercury.

During the process above described, those sand particles which are heavier than the rest, and particularly those which are attached to or incorporate particles of gold or other heavy metal, accumulate to form a layer immediately within or against the layer of mercury and pass upwardly in the bowl past the edge of the disk 23 and into the channel 25 beneath the disk 20. These heavier gold bearing particles, forced inwardly through the channel 25 by the radial pressure of the whirling mixture within the bowl, ultimately enter the passages 31 from which they escape through the ports 32 into the collector channel 40 and finally discharge through the spout 41 into an appropriate receptacle.

At the same time the lighter particles of the mixture pass upwardly in the bowl past the edge of the disk 26, inwardly through the channel 28, upwardly through the passages 33, and outwardly through the ports 35 into the collector channel 42, from which they discharge through the spout 43 into an appropriate receptacle.

Instead of continuously admitting fresh mercury to the bowl in the manner above described, the metal-bearing mercury received from the spout 39 may be used as a substitute, it being continuously returned to and passed through the bowl until its metal content is sufficient to warrant its ultimate withdrawal and subsequent treatment for the recovery of the metal therein.

It has been found that best results are attained when the interior walls of the bowl are of a metal or alloy having amalgamating tendencies, such for instance as copper, because the mercury spreads more readily and more uniformly over those surfaces when such metals are employed. The use of a bowl of copper plated steel has been found to be entirely satisfactory. It has also been found that the accumulation, flow, and discharge in and through the collector channel 38 is much improved if the interior thereof is of an amalgamating metal, and for that purpose the channel 38 is preferably formed of copper or copper plated.

Various changes may be made in the embodiment of the invention hereinabove specifically described without departing from or sacrificing the advantages of the invention as defined in the appended claims.

I claim:—

1. The improved method of separating precious metals from sand-like mixtures which consists in passing the mixture through a substantially cylindrical rotating bowl, whirling the mixture during its passage through the bowl so as to centrifugally project the metal contents of the mixture toward the sides of the bowl, simultaneously flowing a heavy liquid along the internal sides of the bowl to intercept and remove from the bowl the metal thus projected from the mixture, and discharging said liquid inwardly from the bowl against centrifugal force so as to develop a back pressure and thereby maintain a layer of said liquid against the sides of the bowl.

2. The improved method of separating precious metals from sand-like mixtures which consists in passing the mixture through a substantially cylindrical rotating bowl, simultaneously passing a heavy liquid through the bowl and discharging the same inwardly from the bowl against centrifugal force so as to form and maintain a traveling layer of liquid along the internal sides of the bowl, and whirling the mixture during its travel through the bowl to centrifugally project the metal contents of the mixture into the liquid layer thus formed, thereby to convey said metal contents with said liquid from the bowl.

3. The improved method of separating precious metals from sand-like mixtures which consists in passing the mixture through a substantially cylindrical rotating bowl, simultaneously passing mercury through the bowl, whirling the mixture and mercury during passage through the bowl to centrifugally separate the contained metal from the mixture and unite the metal with the mercury in its passage through the bowl, and discharging said mercury inwardly from the bowl against centrifugal force so as to form and maintain a moving layer of mercury against the sides of the bowl.

4. An apparatus for separating precious metals from sand-like mixtures comprising a substantially cylindrical rotary centrifugal bowl, means for admitting the mixture to said bowl to centrifugally project the metal contents of the mixture toward the sides of the bowl, means including an annular member forming a concentric annular chamber open at its outer periphery to the sides of said bowl for directly receiving the metal contents of the mixture therefrom, said member having a periphery closely adjacent the sides of said bowl, a peripheral channel in said bowl spanning said periphery and providing a passage thereabout, said chamber having an outlet spaced inwardly from the sides of said bowl, and means including a separate annular chamber spaced inwardly from the sides of said bowl for discharging another portion of the mixture from said bowl.

5. An apparatus for separating precious metals from sand-like mixtures comprising a substantially cylindrical rotary centrifugal bowl, means for admitting the mixture to said bowl to centrifugally project the metal contents of the mixture toward the sides of the bowl, means including an annular member forming a concentric annular chamber open at its outer periphery to the sides of said bowl for directly receiving the metal contents of the mixture therefrom, said member having a periphery closely adjacent the sides of said bowl, a peripheral channel in said bowl spanning said periphery and providing a passage thereabout, said chamber having an outlet spaced inwardly from the sides of said bowl, and a separate concentric annular chamber having an inlet spaced inwardly from the sides of said bowl, said last named chamber having an outlet spaced further from the sides of said bowl than said first named outlet.

OLAF HARALDSON.